United States Patent

[11] 3,603,932

[72] Inventors Douglas A. Kerr
Albuquerque, N. Mex.;
Bernard B. Kolodner, Philadelphia, Pa.
[21] Appl. No. 814,058
[22] Filed Apr. 7, 1969
[45] Patented Sept. 7, 1971
[73] Assignee Bell Telephone Laboratories, Incorporated
Murray Hill, N.J.

[54] PARTY LINE STATIONS FOR SELECTIVE CALLING SYSTEMS
3 Claims, 1 Drawing Fig.

[52] U.S. Cl. 340/147, 178/69.5, 179/15 AL, 179/15 BS
[51] Int. Cl. H04l 7/00, H04j 3/06
[50] Field of Search 178/69.5, 2, 3; 179/15 BY, 15 BS, 15 AL, 2 AS; 340/147, 163

[56] References Cited

UNITED STATES PATENTS

| | | | |
|---|---|---|---|
| 3,306,978 | 2/1967 | Simmons et al. | 179/15 |
| 3,418,579 | 12/1968 | Hultberg | 178/69.5 |
| 3,453,592 | 7/1969 | Ishii et al. | 178/69.5 |
| 3,479,462 | 11/1969 | Yamato et al. | 179/15 |

*Primary Examiner*—John W. Caldwell
*Assistant Examiner*—Howard Cohen
*Attorneys*—R. J. Guenther and Kenneth B. Hamlin

ABSTRACT: In a party line message distribution system, each station is arranged to provide a delayed response to a common polling or query code on a time division basis by inserting into a time slot individual thereto a response code indicating whether the station is prepared to receive a message. Each station includes an arrangement for modifying the delay to compensate for the delay of the transmission medium. When a station is designated to determine the delay modification, the station sends a test signal which is recirculated back to the station via the control station. The delay of the response is then reduced in accordance with the recirculating time.

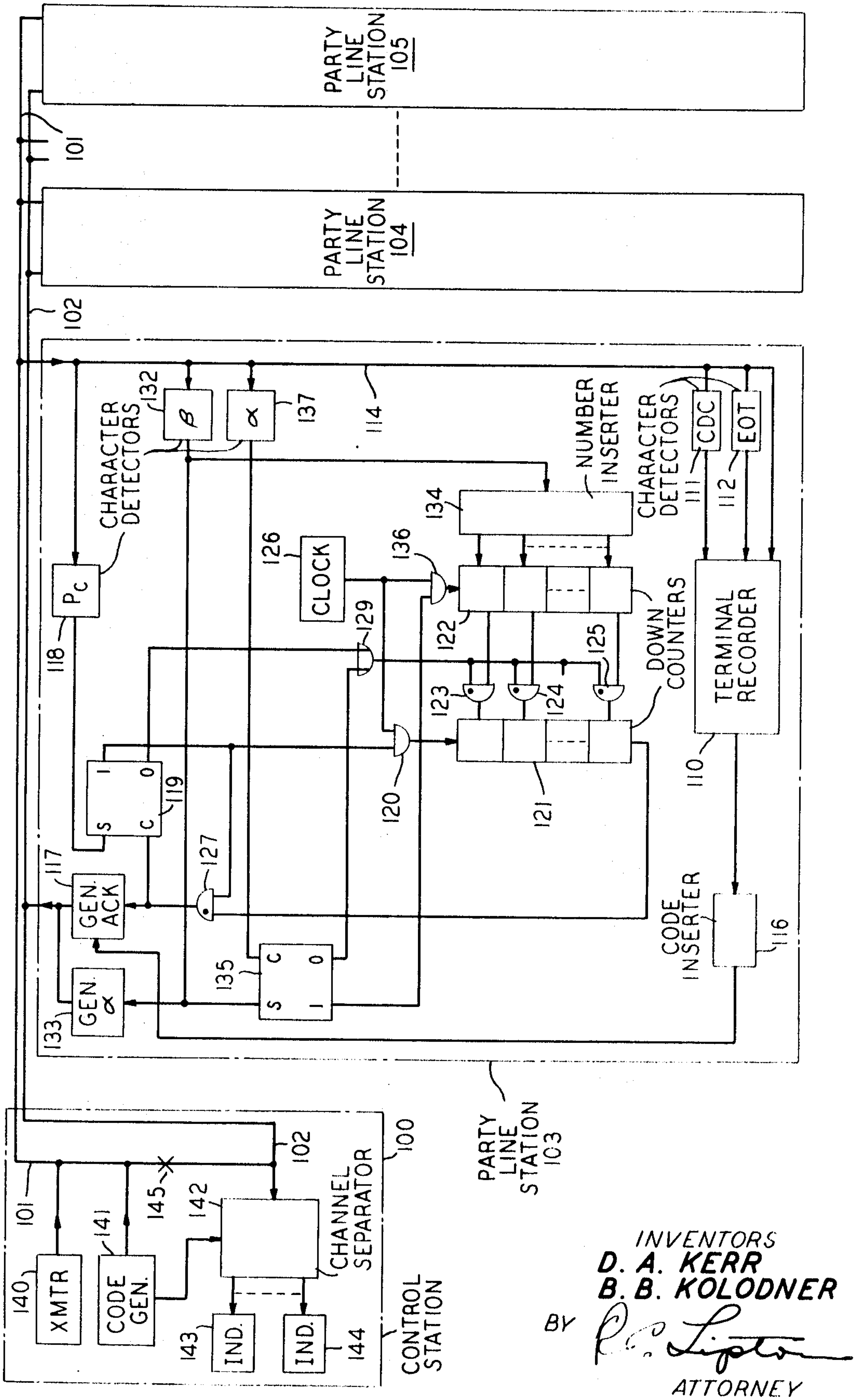
INVENTORS
D. A. KERR
B. B. KOLODNER
BY
ATTORNEY

PARTY LINE STATIONS FOR SELECTIVE CALLING SYSTEMS

FIELD OF THE INVENTION

This invention relates to party line data communication systems and, more particularly, to party line stations which are arranged to respond to queries from a control station.

DESCRIPTION OF THE PRIOR ART

There are many uses for data systems wherein outlying stations respond to queries from a control station. One system involves the distribution of data messages to stations on a party line wherein a sending station selectively sends to addressee stations designated in the data message. Preferably, a control station periodically queries all the party line stations to determine whether each station is prepared to receive and record data messages. These responses are stored and thereafter, when a station desires to send a message, the stored responses are utilized to preclude the attempted selection of those designated stations which are not prepared to receive messages. In this manner, the sending station need not be delayed by attempts to call in designated stations not prepared to receive the message.

If the party line system distributes messages from a computer, a data processor, etc., the length of the message may involve a minimum number of digits or characters. In some instances, the transmission time occupied by the call-in codes used for selecting the designated stations can be comparable to the data message transmission time. Delays in attempting to call in unprepared stations can therefore be significant when viewed in respect to the total transmission time of the message. However, if when the control station periodically queries the party line station, the call-in or selection code of each station is sent followed by a pause to await the response of the queried station, time savings in the elimination of the attempted call-ins of unprepared stations are substantially lost by the prolonged query procedure.

Accordingly, it is an object of this invention to minimize the time interval required to query and obtain responses from remote stations.

In certain telemetering systems wherein a control station queries a plurality of transducers at a remote station, it has been suggested that the various transducers respond to a single common query from the control station by responding on a time division basis. In other words, each transducer is assigned a numbered time slot in which it inserts its response. The control station then identifies each transducer in accordance with the numbered time slot in which the response is received. Synchronization of the time slots at the stations can be provided by clocks, for example, having the same frequency and locked in phase by well known arrangements which respond to the query signal from the control station.

SUMMARY OF THE INVENTION

The illustrative embodiment disclosed herein provides a party line message distribution system wherein the several party line stations respond to a single common query, from the control station, on a time division basis. To this end, each party line station is assigned a numbered time slot and, under control of a clock having the same frequency and locked in phase with the control station clock, inserts its response in its assigned time slot. However, the stations are often geographically remote from the control station and from each other. Transmission line delay, therefore, becomes an important factor since the party line station receives the query signal after a transmission delay and the control station receives the response after a further and additional transmission delay. The response may, therefore, arrive in a subsequent time slot assigned to another party line station.

Therefore, it is another object of this invention to insure that a query response is received in its correct time slot despite the presence of transmission line delays.

In accordance with the present invention, each line station is arranged to delay the response to the query signal from the control station by a predetermined interval. This interval is advantageously set so that the response arrives at the control station within the time slot assigned to the station. To compensate for the transmission line delays from the control station and back to the control station, the predetermined delay interval is modified to develop a cumulative delay interval which is the difference between the predetermined delay interval and the sum of the transmission line delay intervals. Thus, the total interval that elapses from the time that the query signal is transmitted from the control station to the time that the response is received is equal to the interval between the initiation of the clock cycle to the occurrence of the time slot assigned to the responding station.

It is a feature of this invention that each remote station is capable of modifying the predetermined delay assigned to the station. In general, any station is arranged to send a test signal to the control station which recirculates the test signal back to the line station. The circulating time (which corresponds to the sum of the transmission line delays) is then utilized to reduce the predetermined delay assigned to the station.

It is a further feature of this invention that the predetermined delay interval assigned to each station is determined by a count down counter which has a fixed number inserted therein, the number corresponding to the assigned time slot. A clock source, having a pulse repetition frequency equal to or an integral multiple of the control station clock, advances the clock count to zero to obtain the predetermined delay. To modify the delay, the clock advances the countdown from the predetermined count when the test signal is transmitted and terminates the countdown when the recirculated pulse is received. The difference count then defines the proper response delay to compensate for the transmission line delays. The delay modification can, of course, be initiated at the line station. The illustrative arrangement, however, discloses a method wherein the control station initiates the delay modification when it is determined that any response drifts away from its assigned time slot. In this event the control station sends a test code signal to the out-of-phase station and the station, in response thereto, starts its delay modification operation.

The foregoing and other objects and features of this invention will be more fully understood from the following description of an illustrative embodiment thereof taken in conjunction with the accompanying drawings.

BRIEF DESCRIPTION OF THE DRAWING

The drawing shows, in schematic form, a party line message distribution system wherein line stations are further arranged to respond to a query from a control station on a time division basis by delaying the responses in accordance with this invention.

DETAILED DESCRIPTION

The illustrative embodiment of the communication system as shown in the drawing comprises a control station, generally indicated by block 100, a plurality of party line stations which include stations 103, 104 and 105; and a communication line which includes leads 101 and 102. Lead 101 functions as an outgoing channel from control station 100 to the several party line stations. Lead 102 comprises a return or response channel from any one of the party line stations to control station 100.

Control station 100 generally includes a data message transmitter 140, code generator 141, channel separator or commutator 142 and a plurality of receiving or indicating devices, generally indicated by blocks 143 and 144. In general, transmitter 140 comprises a conventional data message transmitter which, when enabled, transmits data characters to outgoing channel 101, which characters make up a data message, the data message being destined for predetermined ones of the party line stations which are selected in a manner described hereinafter. Code generator 141 may comprise any well known generator which produces predetermined code characters and code character sequences under the control of the external equipment, not shown, such as a manually operated keyboard or an electronically controlled data processing machine. Specifically, code generator 141 may be operated to generate call directing code (CDC) sequences for application to outgoing channel 101 to select terminal recorders or receivers at the various party line stations; to generate a start-of-poll code ($P_c$) sequence for application to outgoing channel 101, which sequence, as described hereinafter, initiates responses and acknowledgements from the various party line stations; or to generate test code ($\beta$) sequences to initiate operations at the various party line stations for correcting response delay in accordance with this invention.

Channel separator 142 may comprise a conventional commutator whose operation is initiated by code generator 141 when the start-of-poll code sequence is transmitted to channel 101. It is the function of channel separator 142 to accept the responses from each of the party line stations and apply each response to an indicating device, such as indicator 143, which corresponds to the responding party line station. It is appreciated that channel separator 142 operates at a frequency which is fixed to define time slots, each of the time slots being dedicated to an individual party line station. Assuming that the party line station responds, as described hereinafter, during the time slot dedicated to the station, channel separator 142 thereby directs the response to the indicating device dedicated to the party line station. Accordingly, an indicating device, such as device 143 or device 144, indicates the response received from its associated party line station.

Consider now the operation of control station 100. Assume first that it is desired to poll for responses from the various party line stations to determine whether the recorders thereat are prepared to receive data messages. This operation is initiated by code generator 141 being enabled to send the start-of-poll code sequence. The poll code sequence is thereupon applied to outgoing channel 101 and, as described hereinafter, all of the party line stations recognize the sequence as an instruction to return their responses after appropriate delays so that the responses are received on return channel 102 in their appropriate time slots. At the same time the operation of channel separator 142 is initiated to identify these time slots. Accordingly, the responses are sequentially received from the outlying stations and passed to the appropriate indicating devices. These responses comprise either the code character "ACK," to designate that the recorder is ready or prepared to receive a data message, or "NAK," to indicate lack of preparedness. Control station 100 therefore stores the information indicating whether the several party line station recorders are able to receive data messages.

Assume now that it is desired to send a message from control station 100 to selected ones of the party line stations. By reference to the stored indications in indicators 143 and 144 it is determined which of the party line stations are able to receive the data message. Accordingly, those selected stations which are able to receive the message are identified and code generator 141 is operated to sequentially send the call directing code sequences of those stations. Transmitter 140 is thereafter operated to send the data message, which message comprises various data characters terminated by an end-of-transmission code sequence. Arrangements can thereafter be provided to again send the message when party line stations which were unable to print the message for one reason or another respond during a poll cycle that they are prepared to record data messages.

It is appreciated that where the length of the transmission line is long, then the accumulated transmission delay of the start-of-poll code on outgoing channel 101 to the several party line stations together with the transmission delay of the response on channel 102 from the party line stations results in the response code being received outside the time slot dedicated to the party line station. Accordingly, as described hereinafter, the party line station is arranged to modify the delay thereat in responding to the start-of-poll code sequence. The amount of this modification is determined by an operation which is initiated when control station 101 selects the party line station by sending a test code sequence designating the party line station. The test code sequence is generated by code generator 141 in the conventional manner and passed to outgoing channel 101. At this time, contacts 145 in control station 100 are operated to connect incoming channel 102 to outgoing channel 101.

At the party line station, a test code response ($\alpha$) character is generated in response to the test code sequence. This test code response character is received by station 100 on channel 102 and recirculated back to the party line station by way of contacts 145 and channel 101. As described hereinafter, the party line station utilizes this test code response to ascertain the amount of correction required in the delay of the acknowledgments code.

Each of the party line stations is arranged in substantially the same manner, with several exceptions as noted hereinafter. When the start-of-poll code sequence is transmitted by control station 100 and received by the several party line stations, it is detected by a character detector, such as character detector 118 shown, in party line station 103, connected to outgoing channel 101 via lead 114. Character detector 118 thereupon pulses the input SET lead of flip-flop 119. Flip-flop 119, being set, enables gate 120 and also enables pulser gate 127.

The enabling of gate 120 passes the output of clock 126 to the input of down counter 121. Clock 126 provides clock pulses whose frequency is the same as or an integral multiple of the frequency of commutator 142 in control station 100. Therefore, the interval between successive clock pulses corresponds to a time slot interval. Down counter 121 normally stores therein a predetermined count, which count is determined in a manner described hereinafter. If the station is properly synchronized with channel separator 142, then the number count of the time slot interval assigned to party line station 103 equals the sum of the count stored in counter 121 and the count of the number of time slots whose cumulative intervals correspond to the total transmission line delay from control station 100 over channel 101 to party line station 103 and from party line station 103 back to control station 100 over return channel 102. In other words, assuming the total delay to and from control station 100 is equal to the interval of five time slots and further assuming that party line station 103 has been assigned time slot 50, then the correct count in counter 121 would be 45, whereby a total of 45 plus 5, or 50, time slots is required between the transmission of the start-of-poll code sequence from control station 100 and the reception by control station 100 of the acknowledgements response from party line station 103.

Returning now to the pulsing of counter 121 by clock 126, and recalling that a preset number is in counter 121, the clock pulses proceed to step the count down until the count reaches zero. Counter 121 thereupon produces an output pulse which is passed to the input pulsing lead of pulser gate 127 (the input pulsing lead extending to gate 127 at a point adjacent to a dot in the gate, as shown in the drawing). Pulser gate 127, when enabled, passes pulses applied to its pulsing lead. Accordingly, pulser gate 127 passes the pulse therethrough to the CLEAR input of flip-flop 119 and to generator 117. The clearing of flip-flop 119 disables gate 120 to terminate the application of clock pulses to counter 121. Flip-flop 119 cleared also provides a pulse at output terminal "0," which pulse is passed through OR gate 129 to the input pulsing leads of a plurality of pulser gates represented by pulser gates 123 through 125. The other input leads to pulser gates 123 through 125 are connected to the several stages of down counter 122. As is understood by one skilled in the art, the conditions of the several stages in counter 122 enable or disable pulser gates 123 through 125. It is understood that double rail outputs may be obtained from the stages of counter 122, although, as shown in the drawing, only single rail outputs are disclosed. In either event, the pulse from flip-flop 119 through OR gate 129 is passed through or blocked by pulser gates 123 through 125 whereby the count of down counter 122 is inserted in down counter 121. Down counter 121 is therefore cleared of its prior count and present with a predetermined count corresponding to the count stored in counter 122.

It is recalled that pulser gate 127 also pulses generator 117. Generator 117 is arranged to be encoded with one of two (ACK or NAK) responses. This coding is provided by code inserter 116, which is, in turn, controlled by terminal recorder 110. Terminal recorder 110 may comprise any conventional data message recorder and includes various mechanisms, devices, etc., which may be tested by code inserter 116 to determine whether or not recorder 110 is in condition to print the data message. Code inserter 116, upon determining whether or not a data message can be printed, codes generator 117 with the appropriate acknowledgment response code (ACK or NAK). Accordingly, upon the pulsing of generator 117 by pulser gate 127, the appropriate response code is generated and returned to control station 100 by way of response channel 102. It is recalled that this pulsing of generator 117 is provided after the down counting of counter 121 so that the response code is received by control station 100 in its appropriate time slot, thus advising control station 100 whether party line station 103 is in condition to receive and record a data message.

When control station 100 sends a data message, it is preceded by a call directing code sequence designating party line station 103. The call directing code sequence is detected by character detector 111 which monitors channel 101 via lead 114. Character detector 111 functions to enable terminal recorder 110 to accept incoming data characters from channel 101 via lead 114 and print the characters to thereby record the data message when the call directing code sequence designating the party line station is detected.

At the termination of the data message, the end-of-transmission code sequence is transmitted by control station 100. This sequence is detected by character detector 112. Character detector 112 thereupon restores terminal recorder 110 and the recorder ceases to read and print data characters appearing on channel 101.

When control station 100 determined that party line station 103 is out of phase, i.e., its acknowledgment responses are not within the appropriate time slot, control station 100 sends the test code ($\beta$) sequence individual to the party line station. This test code sequence is detected by character detector 132. Upon the detection of the sequence, character detector 132 pulses generator 133, number inserter 134 and the SET input of flip-flop 135.

The pulsing of generator 133 operates to generate the test code response ($\alpha$) character. This generated test code response character is applied to response channel 102. As previously described, control station 100 circulates the code character back to channel 101. At the same time, the pulsing of the SET input of flip-flop 135 sets the flip-flop. Output terminal "1" of flip-flop 135 thereupon enables gate 136. With gate 136 enabled, clock pulses from clock 126 are passed to down counter 122.

It is recalled that character detector 132 has pulsed number inserter 134. Number inserter 134 may conveniently comprise, for example, a wired matrix arranged to energize the various stages of down counter 132 in a predetermined manner. Specifically, number inserter 134 is arranged to insert a number in down counter 132, which number corresponds to the number of the time slot assigned to party line station 103. In accordance with our previous example, the number to be inserted would therefore be 50. Accordingly, at the instant the test code response character is generated and applied to return channel 102, the number of the time slot assigned to party line station 103 is inserted in down counter 122 and clock pulses from clock 126 are passed through enabled gate 136 to the input of down counter 122.

Down counter 122 now proceeds to count down under control of the clock pulses from clock 126. After the delays due to the transmission delays required to send the test code response character to control station 100 and having it recirculated back over send channel 101, the code is received by party line station 103 and detected by character detector 137. This detector then pulses the CLEAR input of flip-flop 135 to reset the flip-flop. The resetting of the flip-flop disables gate 136, terminating the down count of down counter 122. It is, of course, realized that the number of clock pulses passed by gate 136 during the interval while the test code response character is being recirculated corresponds to the number of time slot intervals whose total duration equals the duration of the total transmission line delay. Therefore, the number in down counter 122 equals the time slot number assigned to party line station 103 less the number of time slot intervals corresponding to the total recirculating time. At the same time, the clearing of flip-flop 135 pulses OR gate 129. The pulse from OR gate 129, as previously described, transfers the count in down counter 122 into down counter 121 by way of pulser gates 123 through 125. Party line station 103 is now arranged to provide the appropriate delays to the response of the poll code sequence as determined by the time slot number assigned to it and the number of time slot intervals corresponding to the total recirculated transmission delays.

Although a specific embodiment of this invention has been shown and described, it will be understood that various modifications may be made without departing from the spirit of this invention.

What we claim:

1. In a line station that acknowledges an incoming query signal by returning a response signal to the line after an adjustable delay interval,
   means for presetting a fixed delay interval,
   means for developing the adjustable delay interval to correspond to the difference between the fixed delay interval and a determinable interval,
   means for applying a test signal to the line, and
   means for determining the determinable interval to correspond to the interval between the application of the test signal to the line and the reception of the test signal after recirculation back from a remote station,
   the said means for developing the adjustable delay interval comprising a downcounter,
   the presetting means including means for inserting into the downcounter a fixed count designating the fixed delay interval,
   the downcounter being operated to down count from the fixed count by the means for determining the determinable interval to thereby obtain a count corresponding to the adjustable delay interval.

2. In a line station in accordance with claim 1 wherein the means for determining the determinable interval includes means for initiating the down count of the downcounter from the fixed count in response to the application of the test signal to the line and means for terminating the down count in response to the reception of the recirculated test signal.

3. In a line station in accordance with claim 1 wherein there is included further downcounting means arranged to have the adjustable delay interval count inserted therein, means to operate the further downcounter means to down count in response to the incoming query signal and means for returning the response signal to the line upon the advance of the further downcounter means to the zero count.